F. J. LINDSAY.
CHEESE PROTECTOR.
APPLICATION FILED JULY 16, 1908.
925,489.
Patented June 22, 1909.
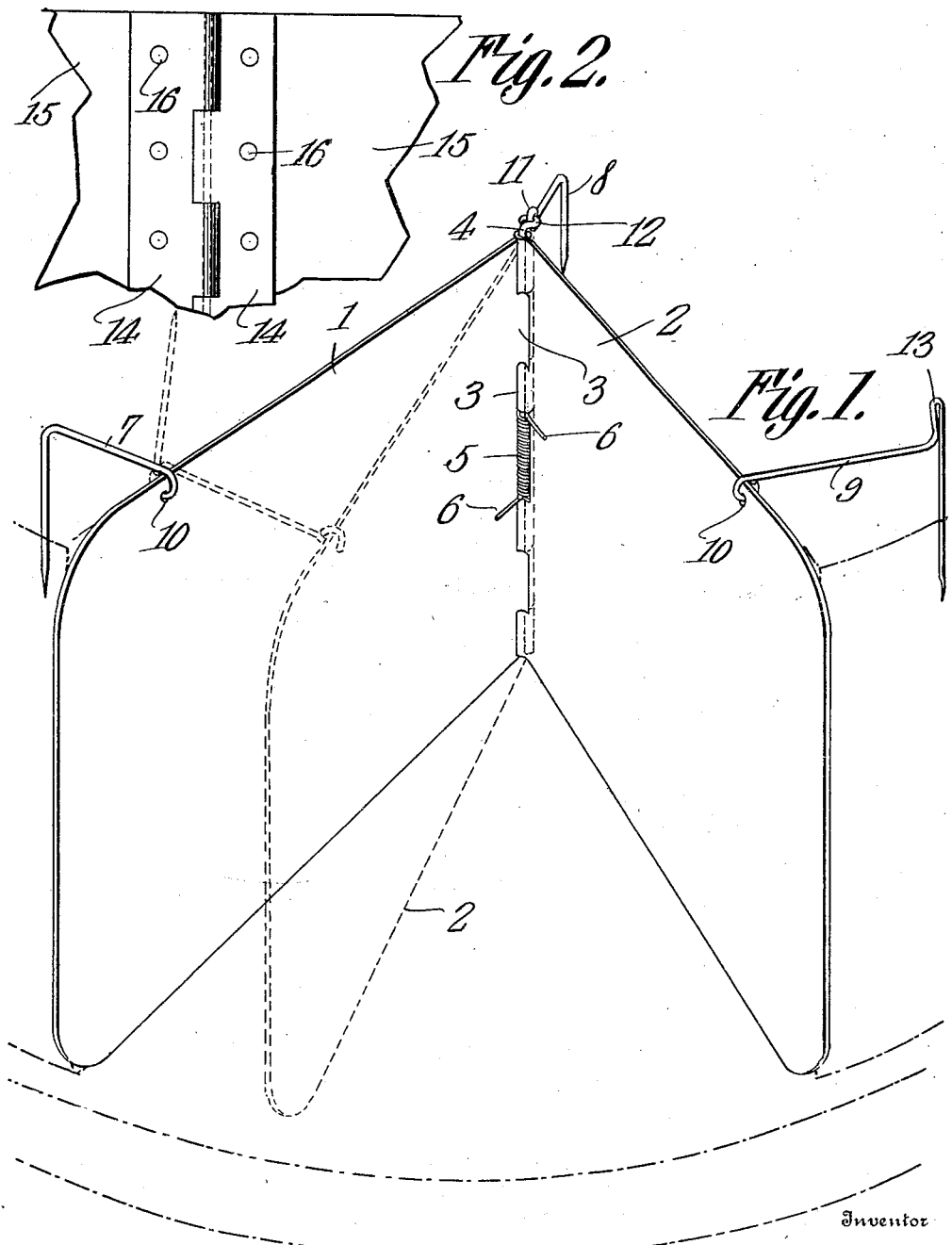
Inventor
Fred James Lindsay,

UNITED STATES PATENT OFFICE.

FRED JAMES LINDSAY, OF FLINT, MICHIGAN.

CHEESE-PROTECTOR.

No. 925,489.

Specification of Letters Patent.

Patented June 22, 1909.

Application filed July 16, 1908. Serial No. 443,888.

*To all whom it may concern:*

Be it known that I, FRED JAMES LINDSAY, a citizen of the United States, residing at Flint, in the county of Genesee and State of Michigan, have invented a new and useful Cheese-Protector, of which the following is a specification.

This invention relates to cheese protectors.

The object of the invention is in a novel, practical, and simple manner to protect the exposed surfaces of the cheese from air-drying, while being sold out in small lots by the retailer, and furthermore, to retain the cheese in a thoroughly sanitary condition by protecting it against the inroads of animals, or the alighting of flies and other insects.

With the above objects in view, as will appear as the nature of the invention is better understood, the same consists, generally stated, in a cheese protector embodying in its construction a pair of shields, and means to cause automatic and continuous contact between the shields and the cut surfaces of a cheese, whereby to prevent drying and to retain the product in the best possible condition for use.

The invention consists further in various novel details of the construction of a cheese protector, as will be hereinafter fully described and claimed.

In the accompanying drawings forming a part of this specification, and in which like characters of reference indicate corresponding parts:—Figure 1 is a view in perspective of a cheese holder embodying the features of the present invention, showing the same operatively assembled with the cheese, the latter being indicated by dotted lines. Fig. 2 is a fragmentary detail view of a modified form of the protector.

As shown in Fig. 1, the protector comprises two shields, 1 and 2, which may be made of any material suited to the purpose, such as sheet metal, celluloid, or wood, and which are operatively connected in this instance by providing the meeting edges of the two sections with butts 3 through which extends a pintle 4, the whole forming thereby a hinge. As stated, it is one of the objects of the invention to cause the shields to retain automatic and continuous contact with the cut surfaces of the cheese, and to secure this result, there is combined with the pintle, preferably at an intermediate point of its length, a coiled spring 5, the terminals 6 of which bear against the opposed faces of the shields. The form of spring shown will be found thoroughly effective for the purposes designed, and will usually, on account of its simplicity of construction and ease with which it may be assembled with the shields, be adopted; but as will be obvious, any other form of spring that will secure the object sought, may be substituted for that shown, and as this will be readily understood, detailed illustration of any modified form is omitted.

In order to hold the shields assembled with a cheese, three hooks or anchoring devices 7, 8 and 9 are employed, the hooks 7 and 9 being disposed adjacent to the outer ends of the shields and at their upper edges and being held assembled therewith by providing orifices 10 through which one end of each of the hooks is looped, thus to allow the insertion and removal of the pointed ends of the hooks relative to the cheese. The hook 8 is provided at one end with a loop 11 that is designed to engage with a loop 12 formed on the upper end of the pintle 4. In addition to the function assigned for the anchoring devices, the one designated 9 is provided with an extension 13, which as shown by the dotted line in Fig. 1, may be hooked over the edge of the shield 1 and thus hold the shield 2 away from the surface of the cheese that is to be cut, thus to facilitate the procedure. The outer ends of the shields are preferably rounded to impart a finished appearance to the article, and also to conform to the rounded edges of the cheese.

Instead of having the hinges made as integral portions of the shields, as shown in Fig. 1, which will generally be preferred where the parts are made of sheet metal, they may be made as separate elements and secured to the shields, as shown in Fig. 2, wherein the hinges 14 are exhibited as secured to the shields 15, which may be made of glass, by rivets or screws 16. The spring employed in the protector, shown in the latter figure may be the same as that displayed in Fig. 1, or of any other character desired.

In the use of the device, when the first section of the cheese has been removed, the two shields are brought together in opposition to the spring, and are inserted within the cut, and as soon as released they will spring outward and bear against the freshly cut surfaces, and the anchoring devices will then be positioned as shown in Fig. 1. The action of the springs will cause the shields to recede from each other and thus follow the cut of the cheese until more than half has been removed, whereupon they will approach each other, and so impinge upon the cheese until it has been entirely disposed of. When a piece of cheese is cut, it being presumed that the groceryman cuts from the right hand wall of the cheese, the shield 2 will be moved toward the shield 1, and the extension 13 hooked over the latter shield, thus leaving the groceryman the freedom of both hands, in cutting the cheese.

One point that will enhance the value of the device is an advertising feature, as the exposed sides of the shields could have displayed on them, in neat and attractive style, matter laudatory of the cheese in connection with which the device is used, or of any other product.

The improvements herein defined while simple in character, will be found efficient for purposes designed, and will result in a marked saving to venders of cheese, who lose a considerable amount on each whole cheese, owing to the evaporation of the moisture therefrom.

I claim:—

1. A cheese protector embodying coacting shields, and means for automatically holding them in contact with the cut surfaces of a cheese.

2. A cheese protector embodying a pair of shields, and means to cause automatic and continuous contact between the shields and the cut surfaces of a cheese.

3. A cheese protector embodying a pair of shields, and means for causing the shields automatically to recede from and then approach each other.

4. A cheese protector embodying a pair of shields, anchoring members carried thereby, and means for causing the shields automatically to recede from and then approach each other.

5. A cheese protector embodying a pair of shields, means for causing the shields automatically to recede from and then approach each other, and anchoring members carried by the shields, one of which constitutes a means for holding the shields in juxtaposed relation.

6. A cheese protector embodying a pair of pivotally connected shields and a spring coacting therewith and operating to cause the shields automatically to recede from and then approach each other.

7. A cheese protector embodying a pair of pivotally connected shields, and a spring coacting therewith and operating to cause the shields automatically to recede from and then approach each other, and means for holding the two shields in juxtaposed relation in opposition to the action of the spring.

In testimony that I claim the foregoing as my own, I have hereto affixed my signature in the presence of two witnesses.

FRED JAMES LINDSAY.

Witnesses:
G. L. PAILTHORP,
F. W. GATES.